United States Patent [19]

Mineur et al.

[11] 4,202,392
[45] May 13, 1980

[54] PNEUMATIC TIRE AND FLUID RESERVOIR ASSEMBLY

[75] Inventors: Mark H. Mineur; Robert L. Toth, both of Cuyahoga Falls, Ohio

[73] Assignee: The Goodyear Tire & Rubber Company, Akron, Ohio

[21] Appl. No.: 887,691

[22] Filed: Mar. 17, 1978

[51] Int. Cl.² .............................................. B60C 17/00
[52] U.S. Cl. ........................... 152/330 L; 152/330 RF
[58] Field of Search ........ 152/330 C, 330 L, 330 RF, 152/399, 400, 347, 427

[56] References Cited
U.S. PATENT DOCUMENTS

| | | | |
|---|---|---|---|
| 3,511,294 | 5/1970 | Bepristis et al. | 152/330 L |
| 3,850,217 | 11/1974 | Edwards et al. | 152/330 RF |
| 3,850,220 | 11/1974 | Mitchell | 152/330 L |
| 3,901,301 | 8/1975 | Edwards | 152/330 L |
| 3,903,946 | 9/1975 | French | 152/330 L |
| 3,920,032 | 11/1975 | Major | 152/330 RF |
| 3,930,526 | 1/1976 | Edwards | 152/330 L |
| 3,930,528 | 1/1976 | Harrington | 152/330 L |
| 3,931,843 | 1/1976 | Edwards et al. | 152/330 L |
| 3,942,573 | 3/1976 | Lawrence | 152/330 L |
| 3,946,783 | 3/1976 | Edwards et al. | 152/330 L |
| 4,051,885 | 10/1977 | French et al. | 152/330 RF |
| 4,130,144 | 12/1978 | Harris | 152/330 L |

Primary Examiner—Richard A. Bertsch
Attorney, Agent, or Firm—D. M. Ronyak

[57] ABSTRACT

A tubeless pneumatic tire/fluid reservoir assembly capable of being mounted upon a standard drop-center rim without deviation from standard mounting procedures for the tire alone. The tire contains an anchoring device comprising a reinforced strip having a first portion bonded and/or integral with the innerliner of the tire and a second portion that is affixed to the fluid reservoir. The fluid reservoir includes a hollow arcuate body capable of containing a fluid under pressure and capable of discharging same under coexisting predetermined conditions of pressure differential and temperature.

22 Claims, 10 Drawing Figures

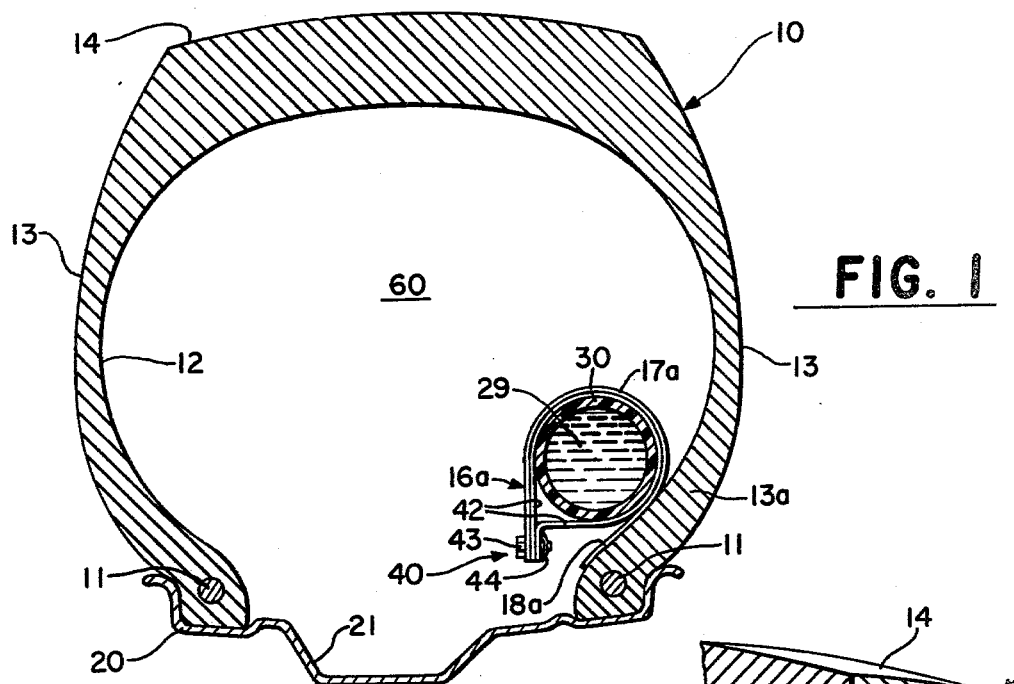
FIG. 1
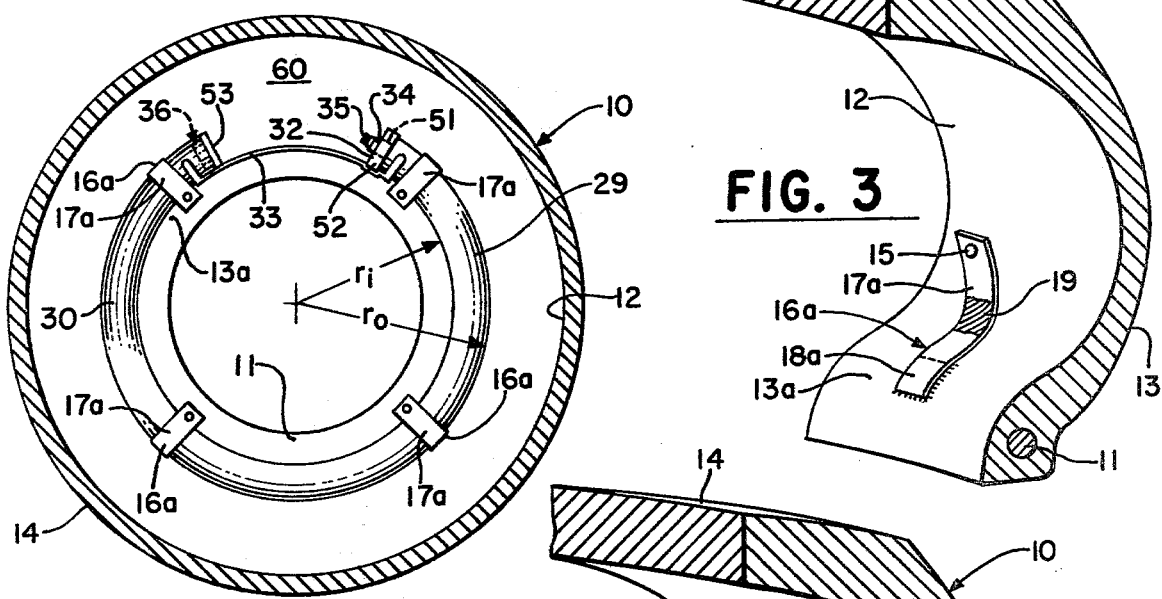
FIG. 2
FIG. 3
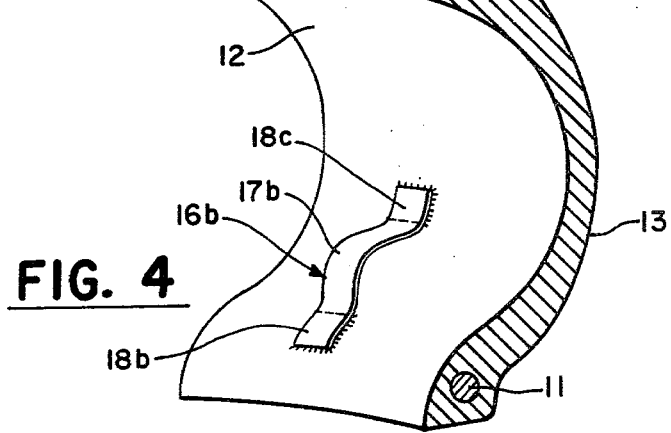
FIG. 4

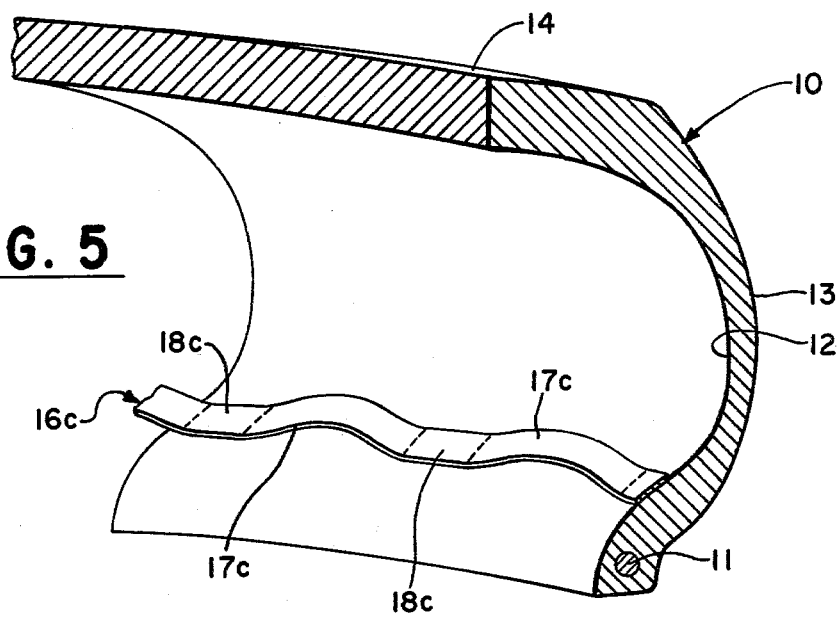
FIG. 5
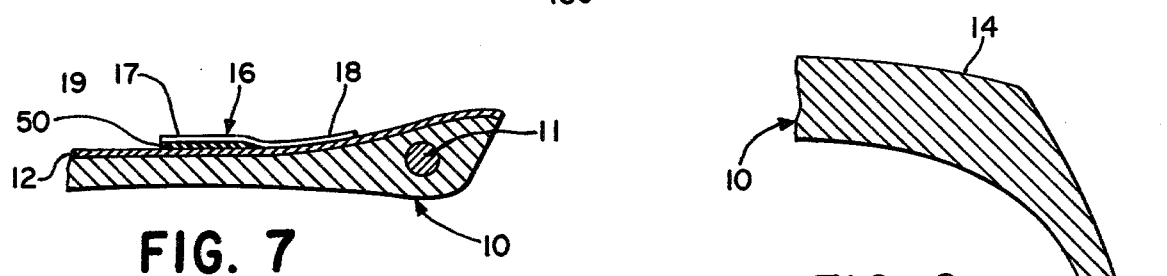
FIG. 7
FIG. 6
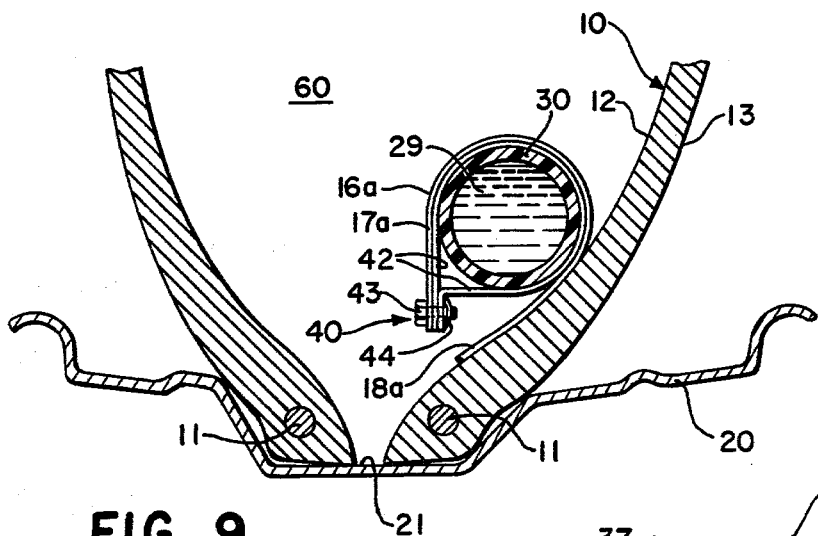
FIG. 9
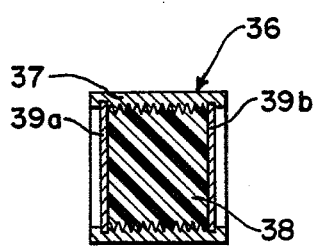
FIG. 10

PNEUMATIC TIRE AND FLUID RESERVOIR ASSEMBLY

BACKGROUND OF THE INVENTION

1. Field of the Invention

This invention relates to a tubeless pneumatic tire-lubricant package assembly which can be mounted upon a standard drop-center rim as an assembly without deviation from normal procedures for mounting a tire.

It is well known that when a pneumatic tire suffers a loss of inflation and continues to be operated in a deflated condition, extreme temperatures soon result from the friction of the inner surfaces upon one another and from hysteresis losses within the tire components. Such temperatures result in damage or total loss of the tire. It is known that this problem can be overcome by provision of a lubricant/coolant within the tire, thereby permitting certain tire constructions to be run flat for a considerable distance, at substantial speeds, without destroying the remaining useful life of the tire.

Because many of the desirable lubricant/coolant compositions are fluid in form, coating the inner periphery of a tire with a fluid composition or merely placing the fluid composition in the inner cavity of a tire with the composition being permitted free movement as the tire rotates, has not proven practical. The composition may become ineffective through deterioration or solidification after being subject to the ambient conditions of the tire cavity for a period of time. Also, non-uniform distribution of the composition of the tire due to its fluidity may cause vibration in the vehicle.

To correct these deficiencies, it has been suggested to provide a reservoir or storage chamber for the fluid. Such reservoir may be affixed to the rim, or to a supporting band affixed to the rim, or to the tire, or made integral of the tire.

Several mechanical devices have been disclosed for effecting a release of the fluid from the reservoir at the proper time, including abrasion sensitive containers, deflection-actuated valves, pressure differential actuated valves, and temperature differential actuated valves.

Devices heretofore disclosed for the storage of the fluid and for its delivery at the proper time have had various shortcomings including a complicated construction with attendant manufacturing difficulties and expense, the need for special procedures in installing and charging the reservoir, and the difficulty or impossibility of mounting the tire when the reservoir is in place, the difficulty or impossibility of dismounting the tire without effecting a release of the contents of the fluid reservoir, or the requirement for non-standard rims or tires specially designed to facilitate incorporation of the reservoir and dispensing means. Additionally, some of the prior art devices are not reusable.

It is an object of this invention to provide a tubeless pneumatic tire/attaching means/fluid package combination that is capable of being mounted on a standard drop-center rim utilizing known automated or manual mounting equipment and only those procedures which are necessary for mounting the tire alone.

It is another object of this invention to provide a tire containing attaching means suitable for anchoring a fluid reservoir dispensing means or other package within its inner cavity.

It is a further object of this invention to provide a simple, inexpensive and uncomplicated method for producing a pneumatic tire containing an anchoring means integral to the innerliner of the tire without use of special manufacturing equipment.

It is still a further object of this invention to provide a fluid reservoir that is capable of being charged and pressurized prior to its assembly into the internal cavity of a tubeless pneumatic tire.

It is still a further object of this invention to provide a fluid reservoir that is capable of being charged prior to its assembly into the internal cavity of a tubeless pneumatic tire and that is subsequently pressurized upon inflation of the tire.

It is still a further object of this invention to provide a fluid reservoir which discharges its contents only upon the simultaneous occurrence of a predetermined drop in inflation pressure of the tire and a predetermined minimum ambient temperature in the interior cavity of the tire.

SUMMARY OF THE INVENTION

In accordance with the invention, a tire is provided having an innerliner to which is attached or bonded thereto a portion of a reinforcing strip. The free end of the strip provides an anchor for attachment of a suitable package within the interior cavity of a tire. The strip is located and oriented such that when the package is attached no portion of the package will interfere with the rim or with the movement of the bead regions toward one another and into the well as occurs during mounting of the tire upon a standard drop-center rim. Preferably, the free portion of the strip begins an amount above the bead area of the tire just sufficient to prevent any restriction of movement required of the beads during mounting. The package should be attached to the free portion of the strip as near to the junction of the free portion and the bonded portion of the strip as practical. This minimizes movement of the package relative to the tire during tire operation. Multiple strips spaced about the circumference of the tire may be used.

The fluid reservoir has a hollow substantially annular body having two valve means passing through it thereby connecting its interior and the internal cavity of the tire in which the fluid package is affixed. The first valve means is a check valve oriented to permit flow into the body of the reservoir. The second valve means according to the invention is normally closed and is set to open to release the fluid contents of the package only upon the coexistence of a predetermined minimum pressure differential between the interior and exterior of the fluid reservoir and a minimum ambient temperature. The second valve means has a hollow tubular body at least a portion of which contains circumferential corrugations. A solid plug of fusible material fills the area in which the corrugations are present. Axially inwardly and outwardly of the solid plug is contained a disc rupturable by a predetermined minimum pressure differential. The radius of curvature of the fluid reservoir is greater than that of the bead area of the tire.

The fluid reservoir is attached to the aforesaid reinforcing strips by mechanical fasteners, which are not part of the invention. The reservoir may be charged and pressurized prior to its attachment. The assembly is then mounted on a drop-center rim through use of standard mounting procedures. No special orientation of the tire to the rim is required. By selection of the dimensions for the lubricant package relative to the tire to which it is to be fitted, it may be positioned so that both beads of the tire may be mounted simultaneously on a standard drop-center rim.

DETAILED DESCRIPTION OF THE INVENTION

FIG. 1 is a view in axial cross-section of a tire/attaching means/fluid reservoir combination according to the invention mounted upon a drop-center rim;

FIG. 2 is a side elevational view of a tire according to the invention which has been sectioned along its equatorial plane to show the attaching means and fluid package of the invention;

FIG. 3 is a perspective view of a fragment of a tire according to the invention, illustrating a preferred embodiment of the attachment means;

FIG. 4 is a similar view of a tire according to the invention, illustrating a second embodiment of the attachment means;

FIG. 5 is a similar view of a tire according to the invention, illustrating a third embodiment of the attachment means;

FIG. 6 illustrates in axial cross-section a fragment of a tire according to the invention containing another embodiment of the attachment means and fluid reservoir according to the invention;

FIG. 7 is a cross-sectional view of a portion of an unvulcanized tire showing a method of manufacture of the attachment means of this invention;

FIG. 9 depicts an axial cross-section of the relative positions of the bead regions of a tire containing an attachment means and fluid package according to this invention during mounting of both beads simultaneously upon a drop-center rim;

FIG. 10 is a sectional view taken parallel to the axis of a fluid release valve according to the invention.

Figure 8:
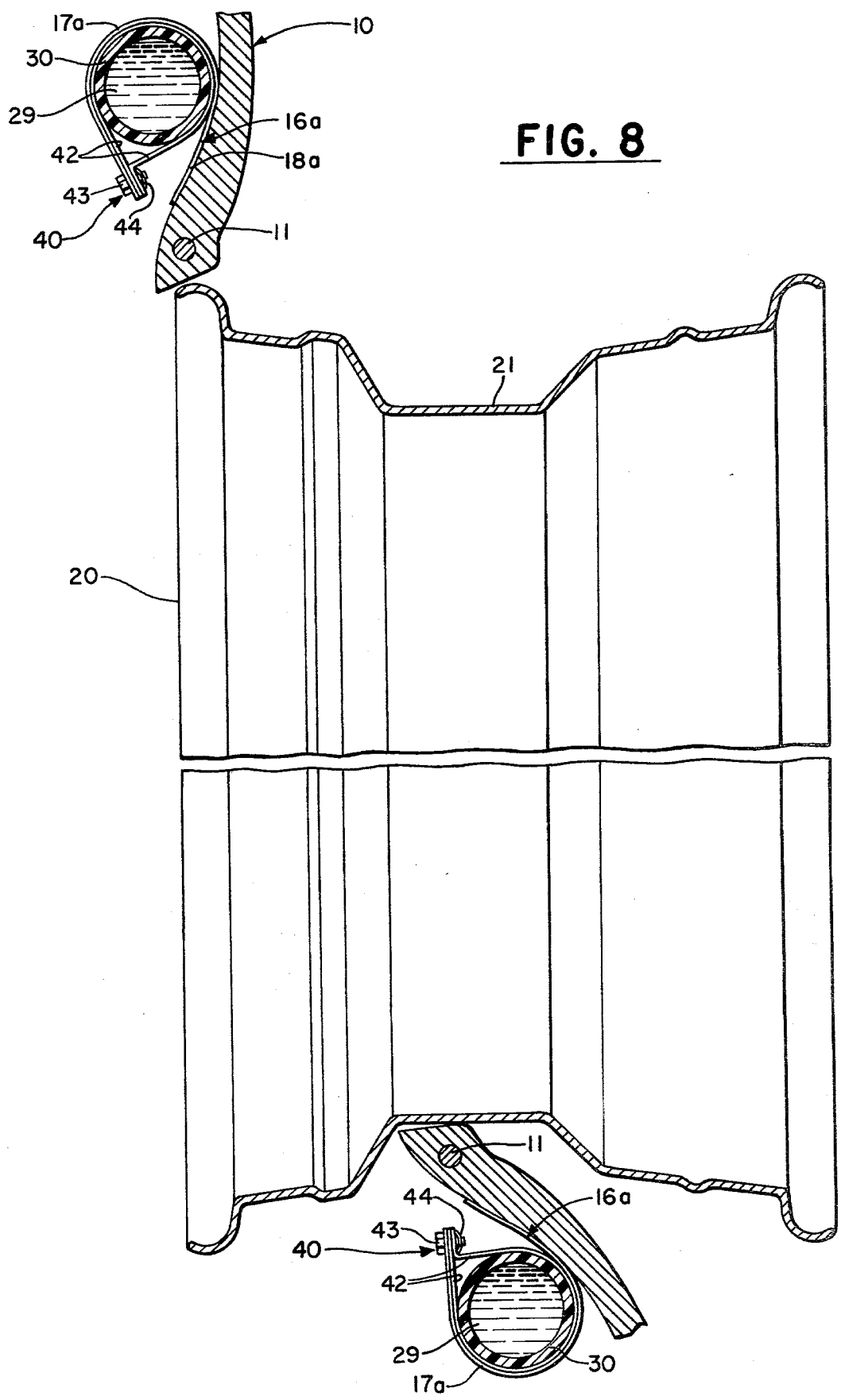
FIG. 8 shows the relative positions of the components of a tire/attachment means/fluid reservoir according to the invention during mounting of one of the beads on a standard drop-center rim.

Referring to FIG. 1, a tire 10 having attachment means 16a is shown having attached to it an annular fluid package or reservoir 29 of circular axial cross-section. The attachment means 16a is identical to that shown in greater detail in FIG. 3. Package 29 is secured to the free portion 17a of attachment means 16a through use of a positive locking fastener 44 such as that shown in FIG. 9. Any positive locking fastener such as a rivet or bolt and nut can be used for securing the package 29 to the free portion 17a of the attachment means 16a. Fastening means 40 is not a part of this invention.

Referring to FIG. 3, the attachment means is shown generally as numeral 16a. A first portion 18a of attachment means 16a is embedded, bonded, or vulcanized to the innerliner 12 of the tire 10 in the lower sidewall region 13a above the tire bead region 11. A second portion 17a of attachment means 16a is free to protrude into the internal cavity or air chamber 60 of the tire. This is a preferred embodiment.

FIG. 4 shows another embodiment of the attachment means. Attachment means 16b is in the form of a radially-oriented reinforced strip having a portion 17b thereof free to protrude into the internal cavity 60 of the tire and having its radially inward portion 18b attached, bonded, or vulcanized to the innerliner 12 of the tire above the bead region 11 and having a third portion 18c attached, bonded, or vulcanized to the tire radially outward of the free portion 17b.

FIG. 5 shows yet another embodiment of the attachment means. The attachment means 16c is in the form of a circumferentially-oriented reinforced strip having first portions 18c thereof attached, bonded, or vulcanized to the innerliner 12 of the tire 10 above the bead region 11 and second portions 17c thereof free to protrude into the internal cavity 60 of the tire. To these free portions 17c the package to be carried within the internal cavity of the tire is attached. This particular embodiment is of advantage where a package must be secured to the interior cavity of a tire and the tire is to be subjected to severe accelerational forces in the circumferential direction as, for example, during aircraft landings or automotive races.

Yet another embodiment of the attaching means of this invention is shown in FIG. 6. The free portion 17d is of reduced length in comparison to 17a of FIG. 3 and is sufficient only to permit attachment to the package, not to envelop it.

A method of manufacture of a tire containing attachment means according to this invention is shown in FIG. 7, which illustrates an embodiment of the attachment means similar to that shown in FIGS. 1 and 3. The steps of manufacture are as follows: (a) the reinforcing strip 19 is coated with a material vulcanizable to the tire innerliner 12; (b) a first portion 18 of the rubberized strip is placed in contact with the tire innerliner; (c) a second portion 17 of the strip has interposed between it and the innerliner 12 a layer 50 of anti-adhesive material. Preferably, layer 50 is of greater area than portion 17. To facilitate assembly, layer 50 preferably is first coated on both faces with a vulcanizable rubber cement prior to its insertion between the innerliner 12 and the free portion 17 of the strip; (d) after lamination the assembly is stitched thoroughly into place to eliminate entrapped air and the tire is cured in the normal manner; (e) after curing, the layer 50 of anti-adhesive material is removed from the tire and the attachment means is ready for use. If desired, a portion of the fastening means 40 shown in FIG. 9 can be molded to the free portion 17a of the reinforcing strip. Alternatively, fastening means 40 can be added after the tire has been cured. The latter is preferred to avoid distortion or damage to the curing bladder and/or the liner of the tire in the vicinity of the attaching means of this invention. As shown in FIG. 3, the free portion 17a of the strip may be reinforced at its point of connection with fastening means 40, e.g. as with a grommet 15.

Suitable anti-adhesive materials are holland cloth, parchment paper, aluminum foil, or film, such as polyester or cellophane. Any cloth or film having anti-adhesive properties to the compound used to coat the strip and the compound used for the innerliner of the tire is suitable for this application. Other examples of suitable anti-adhesive materials are given in U.S. Pat. No. 3,930,528. These include silicone preparations, butyl rubber in solution or strip form, wax-like materials, or combinations of materials which produce a non-compatible compound in relation to the compounds used for the innerliner of the tire and the coating of the reinforcement strip. Materials of the latter group have the advantage that no removal of the anti-adhesive layer is necessary after curing of the tire with the attachment means. However, these systems will not be totally effective if there is much flow or intermixing of the liner compound and the strip-coating compound during vulcanization. Additionally, the position of the anchoring means may not be readily locatable upon removal of the tire from the mold. For these reasons, use of a cloth or film anti-adhesive layer having structural strength and stability is preferred.

It is preferable to vulcanize the first portion 18 of the reinforcing strip to the tire innerliner 12 simultaneously with vulcanization of the tire. However, the reinforcing strip may be bonded to the innerliner of the tire after vulcanization of same. To improve the adhesion of the vulcanized rubber surfaces to one another, the surfaces are first buffed and may be treated with a solution of iodine isocyanate in the manner described in U.S. Pat. No. 3,968,198.

The reinforcing strip should be of limited extensibility in its longitudinal direction. This is to facilitate mounting of the tire/package assembly and enable slight movement of the charged package during operation of the tire/package assembly on a vehicle so that the package is free to seek a center of rotation coinciding with that of the tire and wheel and thereby eliminate any imbalance due to eccentric placement of the package relative to the axis of rotation of the tire. The strip must be of sufficient strength to withstand the axial, radial and circumferential or tangential forces imposed upon it by the fluid package during operation of the vehicle equipped with the combination of this invention. The reinforcing strip is preferably of limited flexibility to minimize movement, especially lateral movement, of the fluid package relative to the tire. If no portion of mechanical fastening means 40 is attached to the free portion of the strip prior to vulcanizing or bonding the strip to the innerliner of the tire, the strip must be of sufficient flexibility and length to enable securing of the mechanical fastener to the free portion of the strip after the strip is attached to the tire. The free portion 17a of the strip shown in FIGS. 1, 2, 3, and 9 is preferably of sufficient length to envelop a majority of the outer circumference in axial section of body 30. This arrangement facilitates assembly of the fluid reservoir 29 to the tire since the point of attachment is always visible and readily accessible. This arrangement positively supports the package by cradling it.

Suitable reinforcing strips can be made of cord fabric, square woven fabric, knit fabric, non-woven fabric, or plastic films. Materials suitable for the reinforcing strip include polyamide, polyester, polyvinyl alcohol, rayon, and fiberglass. Applicants have found that it is particularly convenient to utilize an RFL-treated, 14×14 ends per inch, 965 denier, nylon, plain woven fabric for the reinforcement strip with the cords running at a bias to radial planes of the tire which pass through the strip.

Referring to FIGS. 2 and 9, the fluid package or reservoir 29 includes a hollow body 30 of arcuate shape not forming a complete annulus. The ends 52,53 of the body 30 are joined by an arcuate clip 33 of, e.g. metal or plastic, to form a complete annulus to prevent distortion of the body due to centrifugal forces encountered during operation of a tire to which it is affixed. One or both ends of body 30 may be removably affixed to clip 33 to permit twisting of body 30 into a helix to facilitate insertion into a tire. The inner radius $r_i$ of the body 30 is greater than that of the bead region 11 of tire 10 to which the package is adapted. The amount of differential of radius must be sufficient to avoid interference with the rim 20 upon mounting of the assembly, as shown in FIG. 8. If it is intended to mount both beads of the assembly simultaneously, as shown in FIG. 9, the size of the package and its radius must be such as to allow the bead regions 11 of tire 10 to move freely into the well of the drop-center rim. The outer radius $r_o$ of the body 30 must be substantially less than that part of the tire at the junction of the sidewall innerliner 12 as shown in FIG. 1 and the tread portion 14 to avoid interference between the package and the tire during normal operation. The axial cross-section of body 30 is not critical but a circular cross-section is economical as it yields the greatest contained volume for the amount of material employed to form the body. Body 30 must be capable of containing fluid under pressure. For convenience in handling the reservoir prior to its being charged and pressurized, it is preferable that body 30 be of sufficient rigidity to retain its shape when not pressurized. The body should be somewhat flexible to facilitate mounting of the tire/package assembly onto a drop-center wheel, as during this operation bead regions 11 may be considerably distorted from their normal annular configuration. Applicants have found it particularly convenient to form the body 30 of rigid PVC tubing although other plastics may be employed. Alternatively, the body 30 may be formed of reinforced rubber. A first end 52 of body 30 has a cap 32 having an aperture 51 therein through which is inserted a check valve oriented so as to permit flow of material into the body for charging and pressurizing of same. Standard tire inflation valve body 34 containing a standard tire inflation valve 35 may be used.

At its other end 53, body 30 is formed to removably receive a second valve means 36 which is normally closed. Valve means 36 is set to open and thereby release the contents of body 30 into the internal cavity of tire 10 upon coexistence of a predetermined pressure differential between the interior of body 30 and the air chamber 60 of tire 10 and an ambient temperature equal to or greater than a predetermined amount.

Means must be provided at spaced-apart locations about the circumference of body 30 for connecting body 30 to attachment means 16a; e.g. metallic bands 42. A single band can be readily seen in FIG. 9. Each of the band 42 is formed of a single metallic strip of a length greater than the circumference of the axial cross-section of body 30. Each end of each of said bands has an aperture therein. One of said ends of each of the bands is fitted with a screw-retaining nut. If said bands are not molded or bonded to body 30 after placement around body 30, a joining device such as a screw 43 may be used to fasten the ends of each of the bands tightly against one another. To prevent slippage of the bands 42 relative to the body 30, the bands may be coated with rubber or other friction-developing material. Alternatively, body 30 may have a buttress or flange molded therewith for connection to the free portion of the attachment means via a known mechanical fastener, or for directly receiving and securing the free portion of the attachment means.

The package 29 may be assembled into the cured tire 10 containing the attachment means 16a of this invention as shown in FIG. 9. The free portion 17a of the strip is wrapped around body 30 and the aperture 15, as shown in FIG. 3 of the free portion 17a, is brought into line with screw 43. The screw is passed through aperture 15 and a vibration-proof snap-on fastener 44, such as that shown in FIG. 9, is affixed to the end of the screw. Any positive locking fastener may be used.

The structure of valve eans 36 is shown in FIG. 10. The valve comprises a hollow housing 37 having circumferential corrugations upon at least a portion of its interior. A slug 38 of fusible material is contained between two rupturable membranes 39a,39b. Membranes 39a, 39b may be both designed to rupture at the same pressure differential, for example, 137.9 kN/m² (20 psi). Slug 38 is of a material which melts at a chosen predetermined temperature, such as a metallic alloy. Such materials are well known. Applicants have found that 43.3° C. (110° F.) is an acceptable melting temperature for a typical passenger tire.

The valve operates as follows: when the tire 10 is operated at reduced inflation pressure, its internal temperature begins to rise above levels attained during operation of the tire when normally inflated. As the temperature rises to and beyond the melting point of the fusible slug 38, the membranes 39a,39b will rupture when the pressure differential across them becomes great enough. Once the tire inflation pressure decreases sufficiently to attain the predetermined pressure differential, membranes 39a,39b rupture allowing the contents of body 30 to flow into the air chamber or internal cavity 60 of the tire. If the tire is operated in a cold environment in an under-inflated condition such that the ambient temperature of air chamber 60 does not attain or exceed the melting point of fusible slug 38, slug 38 remains solid and thereby supports membranes 39a,39b against rupture and the valve 36 is not opened since there is no need for a coolant fluid at these temperatures. If the tire is operated such that its internal cavity 60 rises to a temperature above the melting point of fusible slug 38, membranes 39a,39b would still not be ruptured until a sufficient pressure differential developed between the interior of body 30 and the air chamber 60 of the tire.

If membranes 39a,39b are not identical, valve 36 is preferably oriented such that membrane 39a is in communication with the air chamber 60 of the tire. To assure rapid response of valve 36, the area of membranes 39a, 39b should be maximized, the axial length of fusible slug 38 should be minimized, and the thermal conductivity of body 37 and disc 39a should be maximized. Materials chosen for housing 37 and membrane 39a should be of minimum specific heat or thermal capacity and of maximal thermal conductivity. Membrane 39b may be formed of an insulating material to lessen the response time of the valve to a change in the temperature of the air chamber 60 of the tire by preventing the fluid in body 30 from acting as a heat sink. Membrane 39b serves to retain slug 38 should slug 38 become molten when the pressure differential between the interior of body 30 and the tire air chamber 60 is not sufficient to rupture membrane 39a. For this reason, membrane 39b can be considerably weaker than membrane 39a. Membrane 39b may be any flexible membrane or membrane rupturable by a pressure differential less than or equal to that required to rupture membrane 39a. If formed of thermoplastic material, membrane 39a and 39b must have a melting point above that of slug 38.

A tire with the above-described fluid package 30 can be dismounted without discharge of the contents of the package, provided the temperature of the interior cavity of the tire is below the melting point of fusible slug 38. At such temperatures, slug 38 is solid and therefore supports membranes 39a and 39b against rupture from pressure differential.

It is to be understood that the package hereinbefore described need not be attached in the manner just described to be of utility. If the advantages of preassembly and automated mounting are not desired, the package may be affixed in any other suitable manner within the chamber defined by the tire and the rim, so long as valve 36 is in communication with the air chamber of the tire.

It is also to be understood that a fluid package not having all of the features hereindescribed may be affixed to a tire in the manner described to enable mounting of the assembly upon a drop-center rim.

It is also understood that the tire with attaching means hereindescribed may be used to secure packages other than the fluid reservoir just described. For example, it may be desirable to fasten an instrument package to the interior of a tire. For these applications it may be desirable to alter the form and location of the attaching means according to the package to be attached and its intended purpose.

While certain representative embodiments and details have been shown for the purposes of illustrating the invention, it will be apparent to those skilled in the art that various changes and modifications may be made therein without departing from the spirit or scope of the invention.

What is claimed is:

1. A fluid reservoir adapted for cooperation with a pneumatic tire, said reservoir comprising a hollow body for containing a fluid under pressure; a first valve means connecting the interior and exterior of said body for charging and pressurizing of said body; and a second valve means connecting the interior and exterior of said body, said second valve means including a hollow housing, pressure responsive means set in said housing, temperature responsive means in said housing and contained by said pressure responsive means, said temperature responsive means being responsive at a predetermined temperature; said temperature responsive means contributing to the support of said pressure responsive means at temperatures less than said predetermined temperature; said second valve means being normally closed and said second valve means being set to open to release said fluid contained within said body upon co-existence of both a predetermined pressure differential between the interior and exterior of said body and an ambient temperature of at least a predetermined temperature.

2. A fluid reservoir according to claim 1, wherein said body is curved to an inner radius greater than that of the bead of said tire to which it is adapted.

3. A fluid reservoir according to claim 1, wherein said body is of circular cross-section.

4. A fluid reservoir according to claim 3, wherein said body is formed of plastic tubing.

5. A fluid reservoir according to claim 3, wherein said body is of reinforced rubber.

6. A fluid reservoir according to claim 2, wherein said body defines an arc greater than 120 degrees, said body having a first end and a second end, said first end and said second end being removably joined to each other by a rigid arcuate clip, said first end being removably fitted with said first valve means and second end being removably fitted with said second valve means.

7. A fluid reservoir according to claim 1, wherein said first valve means is a check valve oriented so as to permit flow into said body.

8. A fluid reservoir according to claim 7, wherein said first valve means is a standard tire inflation valve assembly.

9. A fluid reservoir according to claim 1, wherein said second valve means comprises a hollow housing having circumferential corrugations on at least a portion of its interior, a first rupturable membrane set in said housing, a second rupturable membrane set in said housing axially distant from said first membrane, and a slug of material fusible at a predetermined temperature between said first and second membranes and in contact with said corrugations and said first and second membranes, said first membrane being set to rupture by a pressure differential across said first membrane of at least a predetermined amount, said second membrane being set to rupture by a pressure differential across said second membrane no greater than said predetermined amount.

10. A pneumatic tire and fluid reservoir assembly capable of being mounted on a rim having a drop-center area and a rim flange located axially outwardly of said drop-center area on both sides thereof by urging said assembly over one of said flanges of said rim,
  (a) said tire having a carcass having an inner liner of vulcanized rubber, an annular tread portion and two sidewall portions each connecting said tread portion to an annular bead region radially inward of said tread portion, and at least one reinforcing strip having a first portion thereof integral with said inner liner radially outwardly of one of said bead regions, and a second portion free of said inner liner; and
  (b) said reservoir being an elongated hollow body of arcuate shape having an inner radius greater than that of said bead region radially outwardly of which it is to be affixed to said second portion and an outer radius substantially less than that part of said inner liner at the junction of said sidewall portion and said tread portion, said body being capable of containing a fluid material under pressure, said body being fitted with first valve means and second valve means, each said valve means connecting the interior of said body and the internal cavity of said tire, said first valve means being a check valve oriented so as to permit flow of material into said body for charging and pressurizing same, said second valve means including a hollow housing, pressure responsive means set in said housing, temperature responsive means in said housing and contained by said pressure responsive means, said temperature responsive means being responsive at a predetermined temperature, said temperature responsive means contributing to the support of said pressure responsive means at temperatures less than said predetermined temperature, said second valve means being normally closed, said second valve means being set to open to release said material into said internal cavity of said tire upon coexistence of both a predetermined pressure differential between said interior and said cavity and a cavity temperature of at least a predetermined value, said body being affixed to said second portion.

11. A pneumatic tire and fluid reservoir assembly according to claim 10, wherein said strip is of rubberized fabric.

12. A pneumatic tire and fluid reservoir assembly according to claim 11, wherein said fabric is square woven, the cords of which are at a bias to the radial planes of said tire passing through said strip.

13. A pneumatic tire and fluid reservoir assembly according to claim 10, wherein the length of said second portion is sufficient to envelop at least 90 degrees of the circumference of the axial cross-section of said body.

14. A pneumatic tire and fluid reservoir assembly according to claim 10, wherein said first valve means is a standard tire inflation valve assembly.

15. A pneumatic tire and fluid reservoir assembly according to claim 10, wherein said second valve means comprises a hollow housing having circumferential corrugations upon at least a portion of its interior, a first rupturable membrane set in said housing, a second rupturable membrane set in said housing axially distant from said first membrane, and a slug of material fusible at a predetermined temperature between said first and second membranes and in contact with said corrugations and said first and second membranes, said first membrane being set to rupture by a pressure differential across said first membrane of at least a predetermined amount, said second membrane being set to rupture by a pressure differential across said second membrane no greater than said predetermined amount.

16. A pneumatic tire and fluid reservoir assembly according to claim 10, wherein said hollow body is of circular cross-section.

17. A pneumatic tire and fluid reservoir assembly according to claim 10, wherein said hollow body is formed of plastic tubing.

18. A pneumatic tire and fluid reservoir assembly according to claim 10, wherein said hollow body is of reinforced rubber.

19. A pneumatic tire and fluid reservoir assembly according to claim 10, wherein said hollow body defines an arc greater than 120 degrees, said hollow body having a first end and a second end, said first end and said second end being detachably joined to each other by a rigid arcuate clip, said first end being removably fitted with said first valve means and said second end being removably fitted with said second valve means.

20. A pneumatic tire and fluid reservoir assembly according to claim 10, wherein said reservoir is charged with a lubricant liquid and a gaseous propellant prior to incorporation into said assembly.

21. A pneumatic tire and fluid reservoir assembly according to claim 10, wherein said body is of sufficient rigidity to substantially retain its shape when not pressurized.

22. A tubeless pneumatic tire and fluid reservoir assembly capable of being mounted on a rim having a drop-center area and a rim flange located axially outwardly of said drop-center area on both sides thereof by urging said assembly over one of said flanges of said rim,
  said tire having a carcass having an innerliner, an annular tread portion, two sidewall portions each connecting said tread portion to an annular bead region radially inward of said tread portion, an anchoring device comprising a narrow reinforcing strip of rubberized cord fabric, the direction of the cords of said fabric being at a bias to the radial planes of said tire passing through said strip, a first portion of said anchoring device being integral with said innerliner radially outwardly of one of said bead regions, and a second portion of said anchoring device being free of said innerliner to protrude into the internal cavity of said tire radially outward of said bead regions, said second portion being of sufficient length to envelop about 180 degrees of the circumference of the axial cross-section of said fluid reservoir and cradle or support the same;

said reservoir being an elongated hollow body of arcuate shape forming about 300 degrees of an annulus, the inner radius of said body being greater than that of said bead regions an amount sufficient to avoid interference with said rim upon mounting of said assembly, the outer radius of said body being substantially less than that part of said innerliner at the junction of said sidewall portion and said tread portion, said body being capable of containing fluid under pressure, said body being of sufficient rigidity to substantially retain its shape when not pressurized and of sufficient flexibility to enable insertion of said body into said tire, said body being fitted with a first valve means connecting the interior of said body and said cavity and located at the first end of said body and a second valve means connecting said interior and said cavity and being located on the second end of said body, said first valve means being a check valve oriented so as to permit flow of material into said body for charging and pressurizing of same, said second valve means being normally closed and being set to open upon the coexistence of both a predetermined pressure differential between said interior and said cavity and a cavity air temperature of at least a predetermined amount, the ends of said body being detachably joined by an arcuate clip, said second valve means being a hollow housing having circumferential corrugations upon at least a portion of its interior surface, a first rupturable membrane set in said housing, a second rupturable membrane set in said housing axially distant from said first membrane, and a slug of material fusible at a predetermined temperature between said first and second membranes and in contact with said corrugations and said first and second membranes, said first membrane being set to rupture by a pressure differential across said first membrane of at least a predetermined amount, said second membrane being set to rupture by a pressure differential across said second membrane no greater than said predetermined amount, and means for attachment of said reservoir to said anchoring device.

* * * * *